United States Patent
Anegawa et al.

(10) Patent No.: US 10,654,526 B2
(45) Date of Patent: May 19, 2020

(54) VEHICLE BODY STRUCTURE

(71) Applicant: HONDA MOTOR CO., LTD., Tokyo (JP)

(72) Inventors: Shota Anegawa, Wako (JP); Takatsugu Kawasaki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 16/190,918

(22) Filed: Nov. 14, 2018

(65) Prior Publication Data

US 2019/0152535 A1 May 23, 2019

(30) Foreign Application Priority Data

Nov. 21, 2017 (JP) .................................. 2017-223898

(51) Int. Cl.
*B62D 25/08* (2006.01)
*B60J 1/00* (2006.01)

(52) U.S. Cl.
CPC ............ *B62D 25/081* (2013.01); *B60J 1/006* (2013.01)

(58) Field of Classification Search
CPC . B60J 1/004; B60J 1/006; B60J 1/007; B62D 25/081
USPC ............................................. 296/190.1, 192
See application file for complete search history.

(56) References Cited

U.S. PATENT DOCUMENTS

| | | | |
|---|---|---|---|
| 2013/0033071 A1* | 2/2013 | Kurata | B62D 25/081 296/192 |
| 2013/0214560 A1* | 8/2013 | Sasaki | B60J 1/02 296/192 |
| 2015/0328963 A1* | 11/2015 | Lee | B60J 1/005 296/192 |
| 2015/0336620 A1* | 11/2015 | Kurihara | B60R 13/07 296/192 |
| 2018/0086187 A1* | 3/2018 | Kurihara | B60J 10/30 |

FOREIGN PATENT DOCUMENTS

JP 2010064518 A 3/2010

* cited by examiner

*Primary Examiner* — Jason S Daniels
(74) *Attorney, Agent, or Firm* — Thomas | Horstemeyer, LLP

(57) ABSTRACT

A vehicle body structure comprises a windshield and a cowl top garnish provided along a lower end portion of the windshield. The cowl top garnish includes a first shield glass abutment portion abutting against a back surface of the windshield and engaging portions engaging with engaged portions provided in the vehicle body. The engaging portions are provided in at least part in a direction along the lower end portion of the windshield. The first shield glass abutment portion occupies a range wider than a range where the engaging portions are provided. The engaging portions are provided at positions farther away from the back surface of the windshield than the first shield glass abutment portion, and engage with the engaged portions in a direction from the back surface to a front surface of the windshield.

7 Claims, 5 Drawing Sheets

VEHICLE BODY STRUCTURE

CROSS-REFERENCE TO RELATED APPLICATIONS

The present application claims priority under 35 U.S.C. § 119 to Japanese Patent Application No. 2017-223898, filed Nov. 21, 2017. The contents of this application are incorporated herein by reference in their entirety.

BACKGROUND OF THE INVENTION

Field of the Invention

The present invention relates to a support structure of a cowl top provided along the lower end portion of a windshield (windscreen) of a vehicle or the like.

Description of the Related Art

An ornamental member called a cowl top is provided in a space between the lower end portion of a windshield of a vehicle or the like and the rear end portion of a bonnet hood. The cowl top is fixed by inserting a fixing member such as a clip into a bracket provided in a vehicle body.

Japanese Patent Laid-Open No. 2010-64518 discloses a technique of fixing a cowl top by attaching spacers to the back surface of the lower end of a windshield and engaging, with the spacers, pawl portions extending from the back surface of the cowl top. It is also disclosed that the spacers are provided only in a part (left and right ends and a central part) of the lower end of the windshield.

In a structure in which the rear end portion of the cowl top is fixed by a clip or the like, depending on the shape of the windshield, floating may occur between the rear end portion of the cowl top and the lower end portion of the windshield.

To prevent this, a lower wall 39 extending from the back surface of the cowl top to the back surface of the windshield, as described in Japanese Patent Laid-Open No. 2010-64518, may be provided over the lower end of the windshield. In this case, however, if a pawl portion 51 is provided in the lower wall, an assembling power is excessively required, resulting in degradation in assembly performance.

SUMMARY OF THE INVENTION

The present invention has been made in consideration of the aforementioned problems, and realizes a vehicle body structure for preventing a cowl top from floating from the lower end portion of a windshield, and preventing degradation in assembly performance.

In order to solve the aforementioned problems, the first aspect of the present invention provides a vehicle body structure comprising: a windshield attached to a vehicle body; and a cowl top garnish provided along a lower end portion of the windshield, wherein the cowl top garnish includes a first shield glass abutment portion configured to abut against a back surface of the windshield, and engaging portions configured to engage with engaged portions provided in the vehicle body in a vehicle longitudinal direction, the engaging portions are provided in at least part in a direction along the lower end portion of the windshield, the first shield glass abutment portion occupies, in the direction along the lower end portion of the windshield, a range wider than a range where the engaging portions are provided, and the engaging portions are provided at positions farther away from the back surface of the windshield than the first shield glass abutment portion, and engage with the engaged portions in a direction from the back surface to a front surface of the windshield.

According to the present invention, it is possible to implement a vehicle body structure for preventing a cowl top from floating from the lower end portion of a windshield, and preventing degradation in assembly performance.

Other features and advantages besides those discussed above shall be apparent to those skilled in the art from the description of an embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

DESCRIPTION OF THE EMBODIMENTS

An embodiment of the present invention will be described in detail below with reference to the accompanying drawings.

<Overall Structure>

The overall structure of a vehicle body structure according to this embodiment will schematically be described with reference to FIGS. 1A, 1B, 2 and 3.

Figure 1A:
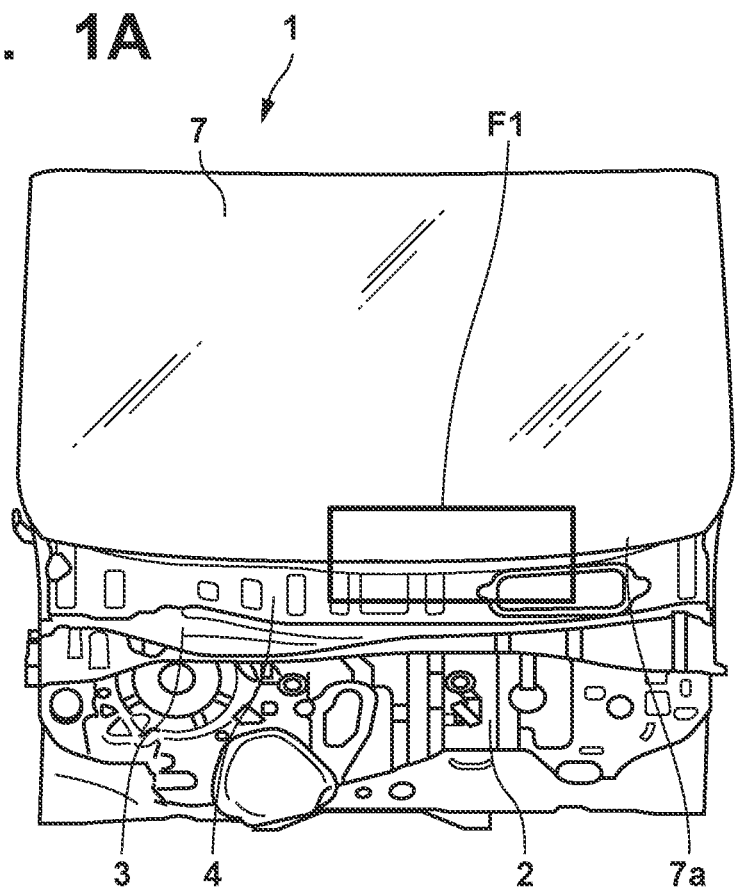
FIG. 1A is a view of a windshield and a vehicle body structure around the windshield when viewed from the front side of a vehicle body according to an embodiment.
Figure 1B:
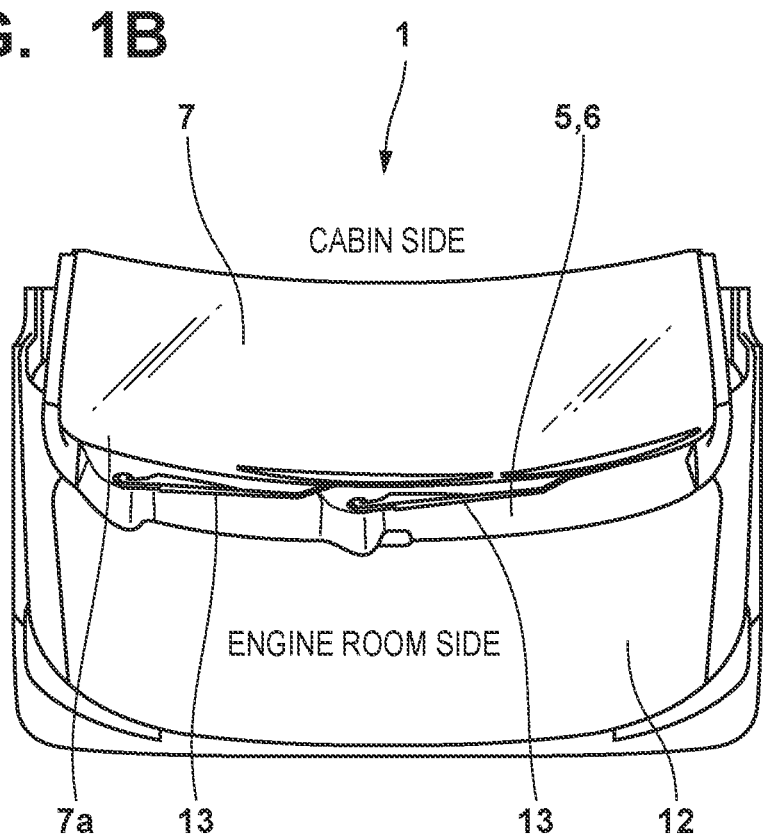
FIG. 1B is a view of the windshield and the vehicle body structure around the windshield when viewed from the upper side of the vehicle body according to the embodiment.
Figure 2:
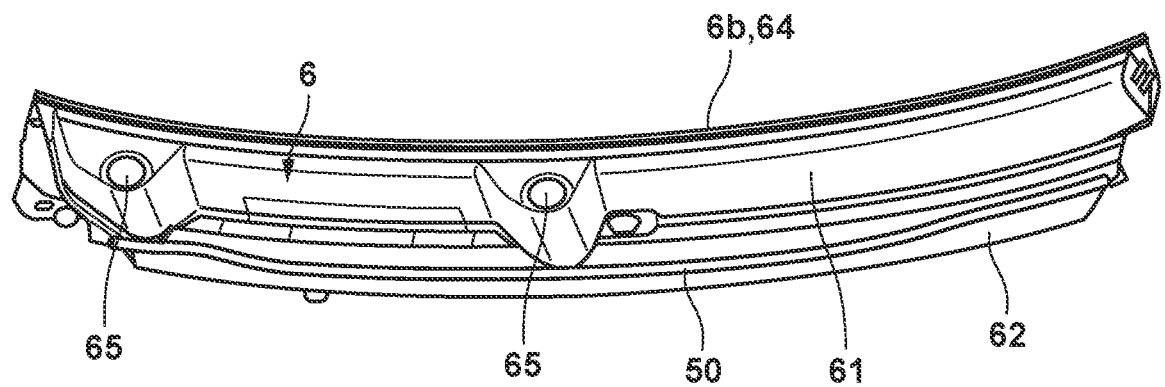
FIG. 2 is a view of the outer appearance of a cowl top garnish according to the embodiment.
Figure 3:
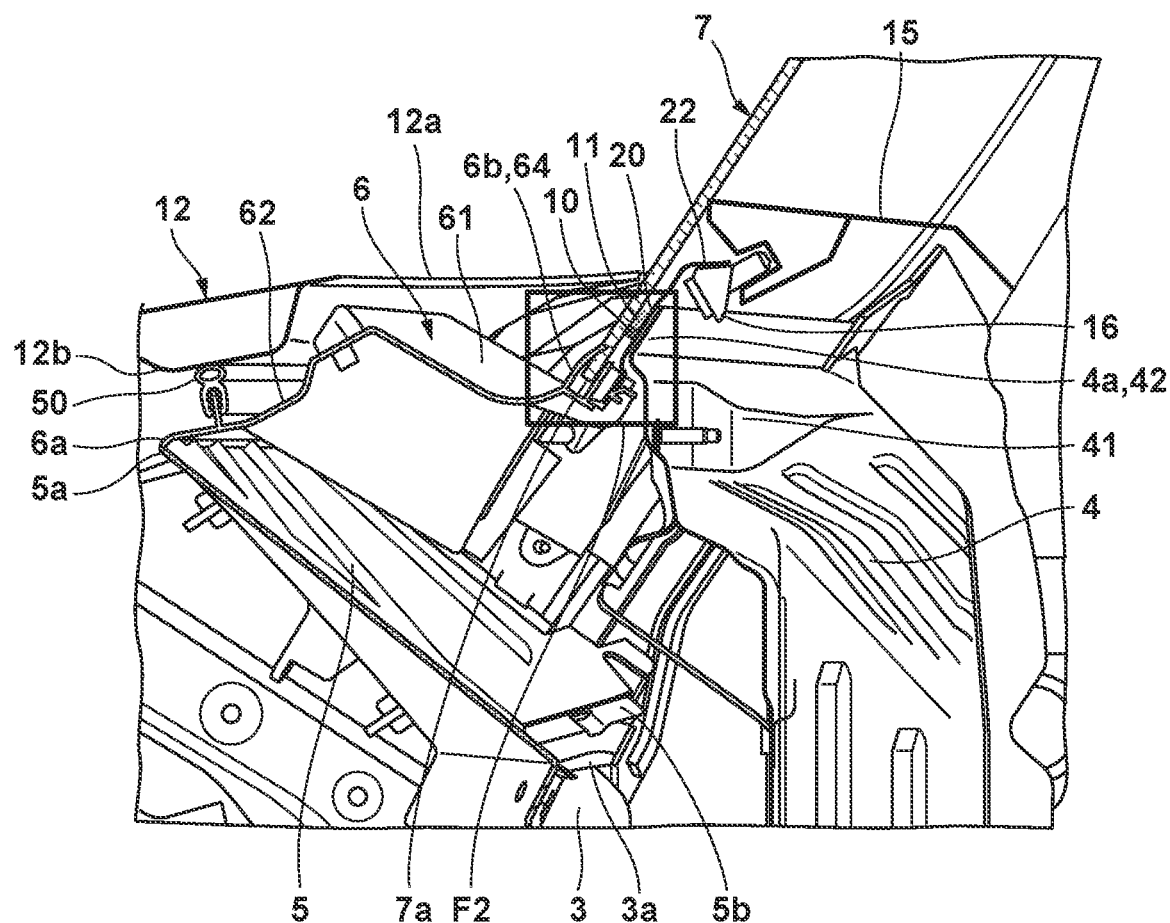
FIG. 3 is a view obtained by cutting, near the center in a vehicle width direction, the vehicle body structure around the lower end portion of the windshield shown in FIG. 1B.

FIG. 1A is a view of a windshield and a vehicle body structure around the windshield when viewed from the front side of a vehicle body according to this embodiment. FIG. 1B is a view of the windshield and the vehicle body structure around the windshield when viewed from the upper side of the vehicle body according to this embodiment. FIG. 2 is a view of the outer appearance of a cowl top garnish according to this embodiment. FIG. 3 is a view obtained by cutting, near the center in a vehicle width direction, the vehicle body structure around the lower end portion of the windshield shown in FIG. 1B.

As shown in FIGS. 1A and 1B, a vehicle body structure 1 according to this embodiment includes dash panels 2 and 3, a windshield lower panel 4, cowl top panels 5 and 6, and a windshield 7. The dash panels 2 and 3 are vehicle body constituent components that partition the engine room side and the passenger room side (cabin side), and include the dash panel lower 2 as a lower side component and the dash panel upper 3 as an upper side component. The windshield lower panel 4 is a vehicle body constituent component that is attached to an upper end portion 2a of the dash panel lower 2, and extends upward to the side of a shield glass back surface 7c of a lower end portion 7a (to be referred to as a shield glass lower end portion hereinafter) of the windshield 7. The shield glass lower end portion 7a is fixed to an upper end portion 4a of the windshield lower panel 4 by an adhesive or the like. A plurality of wipers 13 provided to wipe out the windshield 7 are attached to the cowl top panels 5 and 6.

As shown in FIG. 3, the cowl top panels 5 and 6 are resin molded bodies including the cowl top lower 5 as a lower component and the cowl top upper 6 as an upper component. A lower end portion 5b of the cowl top lower 5 is attached to an upper end portion 3a of the dash panel upper 3, and a lower end portion (or front end portion) 6a and a rear end portion (or upper end portion) 6b of the cowl top upper 6 are attached to an upper end portion (or front end portion) 5a of the cowl top lower 5 and the shield glass lower end portion 7a, respectively. The cowl top upper 6 is an ornamental member that improves an appearance characteristic called a cowl top garnish arranged in a space between the shield glass lower end portion 7a and a rear end portion 12a of a bonnet hood 12. The cowl top upper 6 will be referred to as a cowl top garnish hereinafter.

As shown in FIG. 2, the cowl top garnish 6 is a member that bends in accordance with the shape of the shield glass lower end portion 7a and is long in the vehicle width direction. The cowl top garnish 6 includes a surface portion 61 continuing to a shield glass front surface 7b of the shield glass lower end portion 7a and a tilt portion 62 that tilts downward from the surface portion 61, and the surface portion 61 includes a smooth concave curved surface. A seal member 50 abutting against a back surface 12b of the bonnet hood 12 is attached to the tilt portion 62 in the vehicle width direction. A groove-shaped shield glass fitting portion 64 fitted in the edge portion of the shield glass lower end portion 7a is formed in the vehicle width direction in the rear end portion (or upper end portion) 6b in the surface portion 61 of the cowl top garnish 6. In addition, attaching holes 65 for the plurality of wipers 13 are formed in the cowl top garnish 6.

<Support Structure of Cowl Top Garnish>

A support structure of the cowl top garnish according to this embodiment will be described with reference to FIGS. 4, 5, 6A, 6B, 7A and 7B in addition to FIGS. 1A, 1B, 2 and 3.

Figure 4:
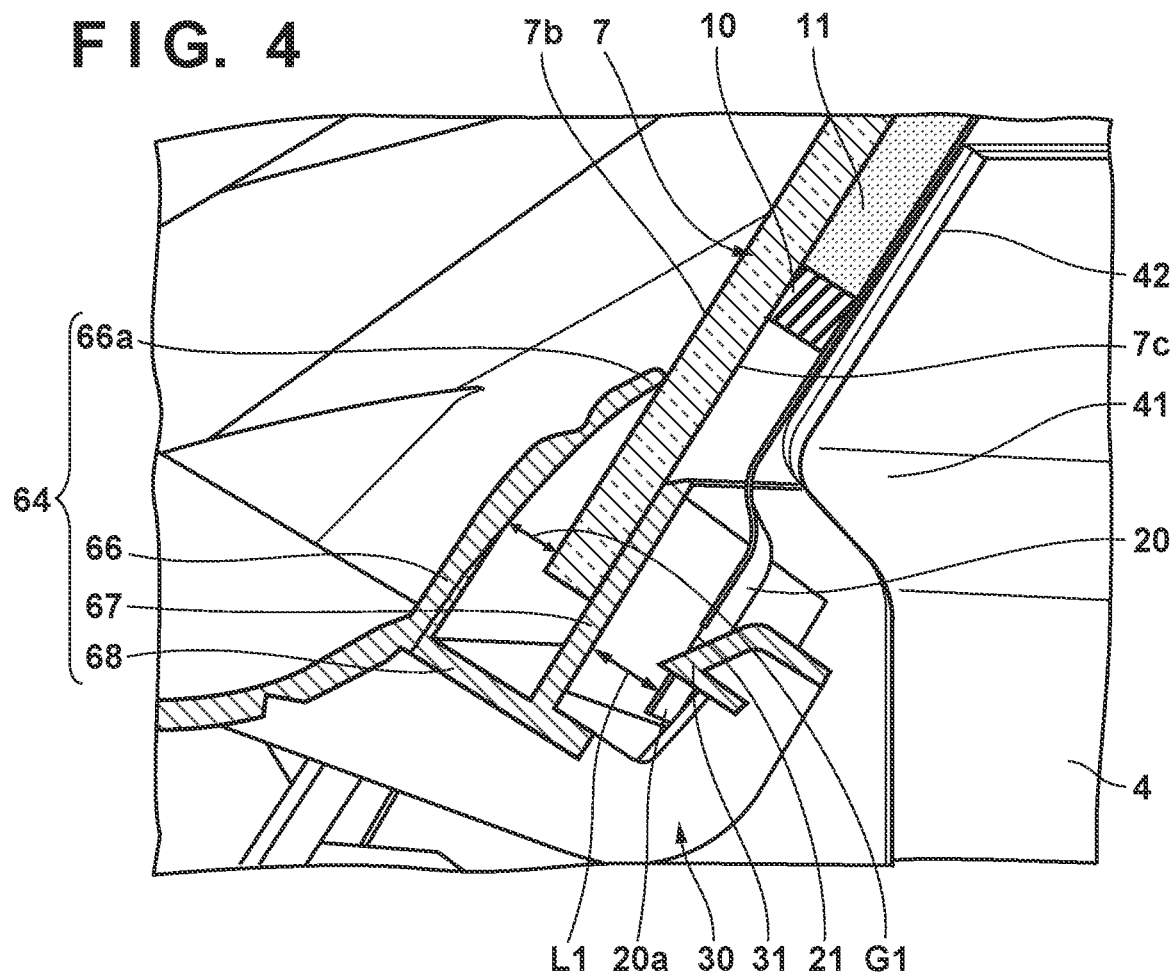
FIG. 4 is an enlarged view of a portion F2 shown in FIG. 3.
Figure 5:
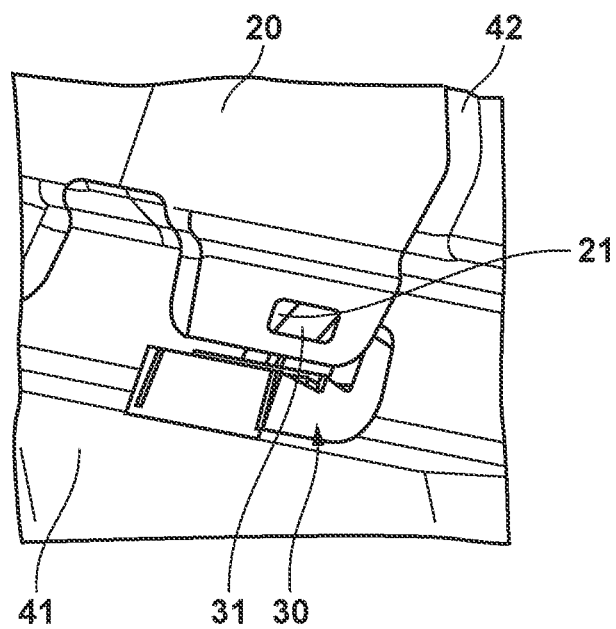
FIG. 5 is a view showing a support structure of the cowl top garnish according to the embodiment.
Figure 6A:
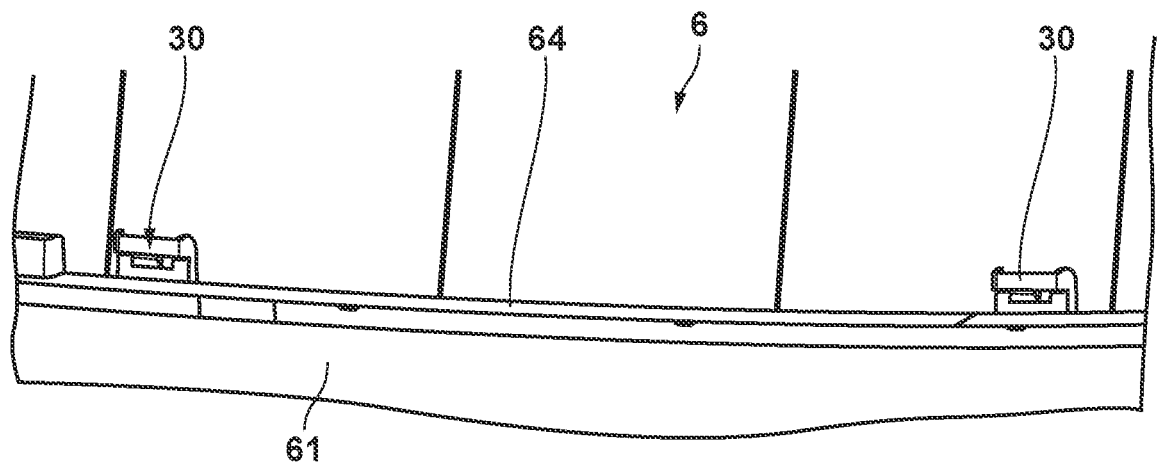
FIGS. 6A and 6B are views each showing the structure of a cowl top-side engaging portion of the cowl top garnish according to the embodiment.
Figure 6B:
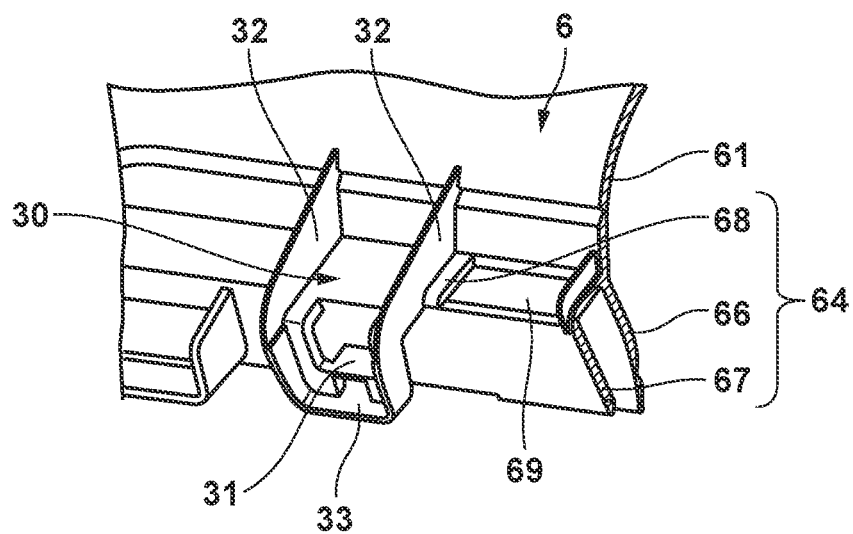
Figure 7A:
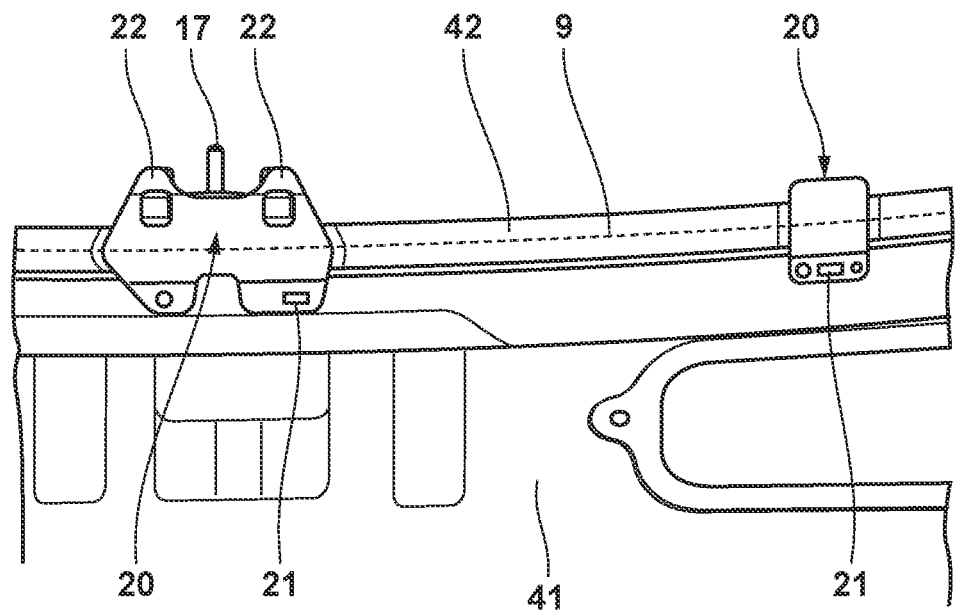
FIG. 7A is an enlarged view of a portion F1 shown in FIG. 1A.
Figure 7B:
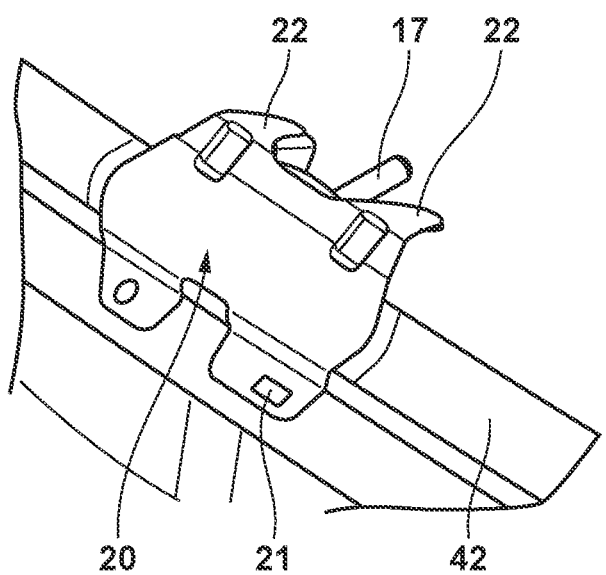
FIG. 7B is an enlarged view showing a cowl top engagement bracket shown in FIG. 7A.

FIG. 4 is an enlarged view of a portion F2 shown in FIG. 3. FIG. 5 is a view showing the support structure of the cowl top garnish according to this embodiment. FIGS. 6A and 6B are views each showing the structure of a cowl top-side engaging portion of the cowl top garnish according to this embodiment. FIG. 7A is an enlarged view of a portion F1 shown in FIG. 1A. FIG. 7B is an enlarged view showing a cowl top engagement bracket shown in FIG. 7A.

As shown in detail in FIG. 4, the shield glass fitting portion 64 of the cowl top garnish 6 includes a front wall portion 66 (second shield glass abutment portion) abutting against the shield glass front surface 7b in the shield glass lower end portion 7a, a rear wall portion 67 (first shield glass abutment portion) abutting against the shield glass back surface 7c, and a back extended portion 68 that extends to connect each of the lower end portions of the front wall portion 66 and rear wall portion 67 in the vertical direction from the back surface of the surface portion 61 to the shield glass back surface 7c, and is thus formed in a groove shape extending in the vehicle width direction. The rear wall portion 67 is provided to protrude from the back extended portion 68 along the shield glass back surface 7c.

As shown in FIGS. 5, 6A and 6B, a cowl top-side engaging portion 30 that engages with a cowl top engagement bracket 20 (engaged portion) provided in the shield glass joint portion 42 of the upper end portion 4a of the windshield lower panel 4 is provided on the back side of the shield glass fitting portion 64 in the cowl top garnish 6. The cowl top-side engaging portion 30 is provided to extend from the back extended portion 68 forming the shield glass fitting portion 64 of the cowl top garnish 6 to the rear side of the vehicle body. In the back extended portion 68, a drain hole 69 is formed adjacent to a portion as a side end portion in the vehicle width direction where the cowl top-side engaging portion 30 is provided. The drain hole 69 is provided to drain rainwater and the like flowing into the shield glass fitting portion 64 of the cowl top garnish 6.

A rectangular hole portion 21 is formed in the cowl top engagement bracket 20, and a wedge-shaped pawl portion 31 that engages with the hole portion 21 of the cowl top engagement bracket 20 is formed in the cowl top-side engaging portion 30. As shown in FIGS. 6A and 6B, the cowl top-side engaging portion 30 includes a pair of ribs 32 extending from the back extended portion 68 on the rear side with respect to the rear wall portion 67, and a bent portion 33 that bends and extends upward from the ribs 32, and the pawl portion 31 is formed in the bent portion 33. As shown in FIG. 4, the pawl portion 31 is provided at a position farther away from the shield glass back surface 7c than the rear wall portion 67 abutting against the shield glass back surface 7c in a direction perpendicular to the shield glass surface, and engages with the hole portion 21 of the cowl top engagement bracket 20 in a direction from the shield glass back surface 7c to the shield glass front surface 7b. At least one cowl top-side engaging portion 30 and at least one cowl top engagement bracket 20 are provided in the cowl top garnish 6 and the windshield lower panel 4, respectively (for example, a central portion in the vehicle width direction and both sides separated from the central portion by a predetermined distance). That is, the cowl top-side engaging portion 30 is provided in part of the shield glass fitting portion 64 of the cowl top garnish 6 in the vehicle width direction, and the front wall portion 66 and rear wall portion 67 of the cowl top garnish 6 occupy a range wider than that of the cowl top-side engaging portion 30 in the vehicle width direction in accordance with the shape of the shield glass lower end portion 7a.

As shown in FIG. 4, a lip portion 66a overlapping the shield glass front surface 7b in the shield glass lower end portion 7a is provided in the front wall portion 66 of the shield glass fitting portion 64 of the cowl top garnish 6. The lip portion 66a has a shape curved toward the shield glass front surface 7b, thereby allowing the distal end portion of the front wall portion 66 of the shield glass fitting portion 64 to be elastically deformed. In a state in which the shield glass back surface 7c in the shield glass lower end portion 7a abuts against the rear wall portion 67 of the shield glass fitting portion 64, a predetermined gap G1 is formed between the shield glass front surface 7b and the back surface of the front wall portion 66. In the state in which the shield glass back surface 7c abuts against the rear wall portion 67 of the shield glass fitting portion 64, a distance L1 between the rear wall portion 67 and an end portion 20a of the cowl top engagement bracket 20 on the front side of the vehicle body is longer than the gap G1 between the shield glass front surface 7b and the front wall portion 66. With this arrangement, the front wall portion 66 of the shield glass fitting portion 64 can be elastically deformed toward the shield glass front surface 7b by the gap G1, and the pawl portion 31 of the cowl top-side engaging portion 30 can be detached from the hole portion 21 of the cowl top engagement bracket 20. In this case, if the front wall portion 66 of the shield glass fitting portion 64 of the cowl top garnish 6 is pressed toward the shield glass front surface 7b of the windshield 7 to be elastically deformed, the pawl portion 31 of the cowl top-side engaging portion 30 moves in a normal direction perpendicular to the shield glass back surface 7c, thereby canceling the engaging state with the hole portion 21 of the cowl top engagement bracket 20.

As shown in FIGS. 3 and 4, the windshield lower panel 4 to which the shield glass lower end portion 7a is joined includes a panel main body portion 41 (vertical wall) extending toward the shield glass back surface 7c, and a flat shield glass joint portion 42 extending upward from the panel main body portion 41 along the shield glass back surface 7c. A portion between the shield glass back surface 7c in the shield glass lower end portion 7a and the shield glass joint portion 42 of the upper end portion 4a of the windshield lower panel 4 is filled with an adhesive 11, and the shield glass back surface 7c is joined while being sealed by a seal member 10 so the adhesive 11 does not flow to the lower side. In a state in which the seal member 10 is adhered to the shield glass back surface 7c of the shield glass lower end portion 7a, the windshield 7 is bonded to the shield glass joint portion 42 of the windshield lower panel 4 by the adhesive 11. The cowl top garnish 6 is attached after the windshield 7 is bonded to the windshield lower panel 4.

As shown in FIGS. 7A and 7B, the cowl top engagement bracket 20 is attached to the shield glass joint portion 42 separately from the windshield lower panel 4 by welding or the like to be located between the shield glass joint portion 42 and the shield glass back surface 7c. The cowl top engagement bracket 20 has a size shorter than the shield glass joint portion 42 of the windshield lower panel 4 in the vehicle width direction along the shield glass lower end portion 7a, and is partially provided in the shield glass joint portion 42. As indicated by a broken line 9 in FIGS. 7A and 7B, the shield glass back surface 7c in the shield glass lower end portion 7a is continuously bonded by the adhesive 11 in the vehicle width direction along the shield glass lower end portion 7a across the cowl top engagement bracket 20 and the shield glass joint portion 42 of the windshield lower panel 4. As shown in FIG. 3 as well, the cowl top engagement bracket 20 includes a pair of rear extended portions 22 extending from the shield glass joint portion 42 to the rear side of the vehicle body, and an instrument panel 15 is attached to the rear extended portions 22 by a panel attaching bracket 16 provided in the rear extended portions 22 and a fastening member 17 such as a tapping screw.

In the above-described embodiment, when the rear wall portion 67 in the shield glass fitting portion 64 of the cowl top garnish 6 abuts against the shield glass back surface 7c, the movement of the cowl top garnish 6 toward the shield glass front surface 7b is suppressed. Thus, even if the cowl top garnish 6 is displaced toward the shield glass front surface 7b, the cowl top garnish 6 is never detached since the cowl top garnish 6 moves in a direction such that the pawl portion 31 of the cowl top-side engaging portion 30 is not detached from the hole portion 21 of the cowl top engagement bracket 20. Therefore, it is possible to prevent the cowl top garnish 6 from floating from the shield glass lower end portion 7a. When the rear wall portion 67 abutting against the shield glass back surface 7c in the cowl top garnish 6 and the cowl top-side engaging portion 30 that engages the cowl top garnish 6 with the windshield lower panel 4 are provided separately so that the range where the cowl top-side engaging portion 30 is provided is narrower than that where the rear wall portion 67 is provided, degradation in assembly performance can be prevented. Furthermore, since a state in which the pawl portion 31 of the cowl top-side engaging portion 30 engages with the hole portion 21 of the cowl top engagement bracket 20 can be released only by pressing the cowl top garnish 6 toward the shield glass front surface 7b, the maintainability is improved.

Since the rear wall portion 67 and the cowl top-side engaging portion 30 are formed in the back extended portion 68 of the shield glass fitting portion 64 of the cowl top garnish 6, the rigidity of each portion is improved. In addition, since a positional shift between the rear wall portion 67 and the cowl top-side engaging portion 30 can be suppressed, it is possible to reliably prevent floating of the cowl top garnish 6.

The state in which the pawl portion 31 of the cowl top-side engaging portion 30 engages with the hole portion 21 of the cowl top engagement bracket 20 can be canceled only by pressing the front wall portion 66 in the shield glass fitting portion 64 of the cowl top garnish 6 toward the shield glass front surface 7b to be elastically deformed.

Even if the front wall portion 66 in the shield glass fitting portion 64 of the cowl top garnish 6 is pressed toward the shield glass front surface 7b, the front wall portion 66 abuts against the windshield 7 first to receive the pressing force, and thus the rear wall portion 67 is prevented from abutting against the hole portion 21 of the cowl top engagement bracket 20, thereby preventing deformation of the hole portion 21 of the cowl top engagement bracket 20.

When the windshield lower panel 4 is provided with the shield glass joint portion 42 extending upward from the panel main body portion 41 along the shield glass back surface 7c, deformation of the windshield lower panel 4 caused by pressing the windshield 7 toward the shield glass back surface 7c can be prevented. In addition, since the shield glass joint portion 42 extends upward along the shield glass back surface 7c, the engaged portion of the cowl top-side engaging portion 30 cannot be provided in the shield glass joint portion 42. Instead, by attaching the separate cowl top engagement bracket 20 to the shield glass joint portion 42, the cowl top-side engaging portion 30 can be engaged with the vehicle body.

When the windshield 7 is joined continuously in the vehicle width direction in a state in which the cowl top engagement bracket 20 is sandwiched between the windshield 7 and the shield glass joint portion 42 of the windshield lower panel 4, the attaching rigidity of the bracket 20 is improved.

When the instrument panel 15 is attached to the rear extended portions 22 of the cowl top engagement bracket 20, it is unnecessary to additionally provide a bracket for attaching the instrument panel 15, thereby making it possible to decrease the number of components.

Note that the above-described embodiment is merely an example for implementing the present invention, and the present invention is applicable to a revision or a modification of the embodiment without departing from the spirit and the scope of the present invention.

Summary of Embodiment

<First Aspect>

There is provided a vehicle body structure 1 comprising:
a windshield 7 attached to a vehicle body; and
a cowl top garnish 6 provided along a lower end portion 7a of the windshield 7,
wherein the cowl top garnish 6 includes
a first shield glass abutment portion 67 configured to abut against a back surface 7c of the windshield 7, and
engaging portions 30 and 31 configured to engage with engaged portions 20 and 21 provided in the vehicle body in a vehicle longitudinal direction,
the engaging portions 30 and 31 are provided in at least part in a direction along the lower end portion 7a of the windshield 7,
the first shield glass abutment portion 67 occupies, in the direction along the lower end portion 7a of the windshield 7, a range wider than a range where the engaging portions 30 and 31 are provided, and
the engaging portions 30 and 31 are provided at positions farther away from the back surface 7c of the windshield 7 than the first shield glass abutment portion 67, and engage with the engaged portions 20 and 21 in a direction from the back surface 7c to a front surface 7b of the windshield 7.

According to the first aspect, when the first abutment portion 67 abuts against the shield glass back surface 7c, the movement of the cowl top garnish 6 toward the shield glass front surface 7b is suppressed. Even if the cowl top garnish 6 is displaced toward the shield glass front surface 7b, the cowl top garnish 6 is never detached since the cowl top garnish 6 moves in a direction such that the engaging portions 30 and 31 are not detached from the engaged portions 20 and 21. Therefore, it is possible to prevent the cowl top garnish 6 from floating from the shield glass lower end portion 7a. When the first abutment portion 67 abutting against the shield glass back surface 7c in the cowl top garnish 6 and the engaging portions 30 and 31 that engage the cowl top garnish 6 with the vehicle body are provided separately so that the range where the engaging portions 30 and 31 are provided is narrower than that where the first abutment portion 67 is provided, degradation in assembly performance can be prevented. Furthermore, since a state in which the engaging portions 30 and 31 engage with the engaged portions 20 and 21 can be canceled only by pressing the cowl top garnish 6 toward the shield glass front surface 7b, the maintainability is improved.

<Second Aspect>

In the first aspect, the cowl top garnish 6 includes a surface portion 61 extending along the front surface 7b of the windshield 7 and a back extended portion 68 extending in a direction from the surface portion 61 to the back surface 7c of the windshield, and
the first shield glass abutment portion 67 and the engaging portions 30 and 31 are provided in the back extended portion 68.

According to the second aspect, the first abutment portion 67 and the engaging portions 30 and 31 are formed in the back extended portion 68 in the cowl top garnish 6, the rigidity of each portion is improved. Since a positional shift between the first abutment portion 67 and the engaging portions 30 and 31 can be suppressed, it is possible to reliably prevent floating of the cowl top garnish 6.

<Third Aspect>

In the second aspect, the surface portion 61 includes a second shield glass abutment portion 66 overlapping the front surface 7b of the windshield 7, and in a state in which the first shield glass abutment portion 67 abuts against the back surface 7c of the windshield 7, a gap G1 is formed between the front surface 7b of the windshield 7 and the second shield glass abutment portion 66.

According to the third aspect, it is possible to cancel the state in which the engaging portions 30 and 31 engage with the engaged portions 20 and 21 only by pressing the second abutment portions 66 in the cowl top garnish 6 toward the shield glass front surface 7b to be elastically deformed.

<Fourth Aspect>

In the third aspect, in the state in which the first shield glass abutment portion 67 abuts against the back surface 7c of the windshield 7, a distance L1 from the first shield glass abutment portion 67 to the engaged portions 20 and 21 is longer than the gap G1.

According to the fourth aspect, even if the second abutment portion 66 in the cowl top garnish 6 is pressed toward the shield glass front surface 7b, the front wall portion 66 abuts against the windshield 7 first to receive the pressing force, and thus the first abutment portion 67 is prevented from abutting against the engaged portions 20 and 21, thereby preventing deformation of the engaged portions 20 and 21.

<Fifth Aspect>

In one of the first to fourth aspects, the vehicle body includes a windshield lower panel 4 attached with the windshield 7,
the windshield lower panel 4 includes a panel main body portion 41 extending toward the back surface 7c of the windshield 7, and a shield glass joint portion 42 extending upward from the panel main body portion 41 along the back surface 7c of the windshield,
the windshield 7 and a bracket 20 are attached to the shield glass joint portion 42, and
the engaged portion 21 is provided in the bracket 20.

According to the fifth aspect, when the windshield lower panel 4 is provided with the shield glass joint portion 42 extending upward from the panel main body portion 41 along the shield glass back surface 7c, deformation of the windshield lower panel 4 caused by pressing the windshield 7 toward the shield glass back surface 7c can be prevented. In addition, since the shield glass joint portion 42 extends upward along the shield glass back surface 7c, the engaged portion of the engaging portion 30 cannot be provided in the shield glass joint portion 42. Instead, by attaching the separate cowl top engagement bracket 20 to the shield glass joint portion 42, the engaging portion 30 can be engaged with the vehicle body.

<Sixth Aspect>

In the fifth aspect, the bracket 20 is shorter than the shield glass joint portion 42 in a direction along the lower end portion 7a of the windshield 7, and is arranged between the shield glass joint portion 42 and the back surface 7c of the windshield 7, and
the windshield 7 is joined continuously across the shield glass joint portion 42 and the bracket 20.

According to the sixth aspect, when the windshield 7 is joined continuously in the vehicle width direction in a state in which the cowl top engagement bracket 20 is sandwiched between the windshield 7 and the shield glass joint portion 42 of the windshield lower panel 4, the attaching rigidity of the bracket 20 is improved.

<Seventh Aspect>

In the sixth aspect, the bracket 20 includes a rear extended portion 22 extending from the shield glass joint portion 42 to a rear side of the vehicle body, and an instrument panel 15 is attached to the rear extended portion 22.

According to the seventh aspect, when the instrument panel 15 is attached to the rear extended portion 22 of the bracket 20, it is unnecessary to additionally provide a bracket for attaching the instrument panel 15, thereby making it possible to decrease the number of components.

What is claimed is:

1. A vehicle body structure comprising:
   a windshield attached to a vehicle body; and
   a cowl top garnish provided along a lower end portion of the windshield,
   wherein the cowl top garnish includes
   a first shield glass abutment portion configured to abut against a back surface of the windshield, and
   engaging portions configured to engage with engaged portions provided in the vehicle body in a vehicle longitudinal direction,
   the engaging portions are provided in at least part in a direction along the lower end portion of the windshield,
   the first shield glass abutment portion occupies, in the direction along the lower end portion of the windshield, a range wider than a range where the engaging portions are provided, and
   the engaging portions are provided at positions farther away from the back surface of the windshield than the first shield glass abutment portion, and engage with the engaged portions in a direction from the back surface to a front surface of the windshield.

2. The structure according to claim 1, wherein
   the cowl top garnish includes a surface portion extending along the front surface of the windshield and a back extended portion extending in a direction from the surface portion to the back surface of the windshield, and
   the first shield glass abutment portion and the engaging portions are provided in the back extended portion.

3. The structure according to claim 2, wherein
   the surface portion includes a second shield glass abutment portion overlapping the front surface of the windshield, and
   in a state in which the first shield glass abutment portion abuts against the back surface of the windshield, a gap is formed between the front surface of the windshield and the second shield glass abutment portion.

4. The structure according to claim 3, wherein
   in the state in which the first shield glass abutment portion abuts against the back surface of the windshield, a distance from the first shield glass abutment portion to the engaged portions is longer than the gap.

5. The structure according to claim 1, wherein
   the vehicle body includes a windshield lower panel attached with the windshield,
   the windshield lower panel includes a panel main body portion extending toward the back surface of the windshield, and a shield glass joint portion extending upward from the panel main body portion along the back surface of the windshield,
   the windshield and a bracket are attached to the shield glass joint portion, and
   the engaged portion is provided in the bracket.

6. The structure according to claim 5, wherein
   the bracket is shorter than the shield glass joint portion in a direction along the lower end portion of the windshield, and is arranged between the shield glass joint portion and the back surface of the windshield, and
   the windshield is joined continuously across the shield glass joint portion and the bracket.

7. The structure according to claim 6, wherein
   the bracket includes a rear extended portion extending from the shield glass joint portion to a rear side of the vehicle body, and
   an instrument panel is attached to the rear extended portion.

* * * * *